US007599198B2

(12) United States Patent
Tao et al.

(10) Patent No.: US 7,599,198 B2
(45) Date of Patent: Oct. 6, 2009

(54) RESONANCE CONVERTER AND SYNCHRONOUS RECTIFICATION DRIVING METHOD THEREOF

(75) Inventors: Hong-Shan Tao, Shanghai (CN); Hong-Jian Gan, Shanghai (CN); Jian-Ping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 321 days.

(21) Appl. No.: 11/780,873

(22) Filed: Jul. 20, 2007

(65) Prior Publication Data

US 2008/0055942 A1 Mar. 6, 2008

(30) Foreign Application Priority Data

Sep. 6, 2006 (TW) ............................. 95132975 A

(51) Int. Cl.
*H02M 3/335* (2006.01)

(52) U.S. Cl. ................... 363/17; 363/21.03; 363/21.06; 363/21.14

(58) Field of Classification Search ............. 363/15–17, 363/21.02, 21.03, 21.06, 21.14, 79, 88, 89, 363/95, 98, 127; 323/235, 319
See application file for complete search history.

(56) References Cited

U.S. PATENT DOCUMENTS 5,805,432 A * 9/1998 Zaitsu et al. .................. 363/16
6,934,167 B2 * 8/2005 Jang et al. ................ 363/21.02
7,184,280 B2 * 2/2007 Sun et al. ................ 363/21.02

* cited by examiner

*Primary Examiner*—Jessica Han
*Assistant Examiner*—Emily Pham
(74) *Attorney, Agent, or Firm*—Volpe And Koenig, P.C.

(57) ABSTRACT

A resonance converter and a synchronous rectification driving method thereof are provided. The resonance converter includes a switch circuit having at least two first switches, a resonance circuit having a resonance frequency, a transformer, and a full-wave rectification circuit having two second switches each of which has a drain and a source and generates a channel resistance voltage when a current flows through the drain and the source. The synchronous rectification driving method includes steps as follow. When an operating frequency of the resonance converter is less than the resonance frequency and the resonance converter is coupled to a heavy load, the channel resistance voltage is compared with a reference voltage for driving the second switches of the full-wave rectification circuit; and when the operating frequency of the resonance converter is not smaller than the resonance frequency, duplicated signals of signals used to drive the first switches are respectively used to drive the second switches of the full-wave rectification circuit.

14 Claims, 7 Drawing Sheets

RESONANCE CONVERTER AND SYNCHRONOUS RECTIFICATION DRIVING METHOD THEREOF

FIELD OF THE INVENTION

The present invention relates to a resonance converter and a synchronous rectification driving method, more particularly to an LLC series resonance converter for a power supply unit.

BACKGROUND OF THE INVENTION

Please refer to FIG. 1, which is a circuit diagram showing a circuit of a conventional LLC series resonance converter having synchronous rectification transistors. The LLC series resonance converter 100 in FIG. 1 includes chiefly a switch circuit 110, a resonance circuit 120, a transformer TX, and a full-wave rectification circuit 130.

In the LLC series resonance converter 100, the switch circuit 110 can be a half-bridge circuit including a pair of power transistors S1 and S2 in FIG. 1 and can be a full-bridge circuit as well. Additionally, the resonance circuit 120 includes three resonance parameters connected in series, wherein the parameters are a resonance inductor Ls, a resonance capacitor Cs and a magnetizing inductor Lm of the transformer TX. Of course, for the skilled person, the resonance inductor Ls can be formed from a leakage inductance of the transformer TX, too.

In FIG. 1, the LLC series resonance converter 100 employs the switch circuit 110, the resonance circuit 120, the transformer TX, and the full-wave rectification circuit 130 to convert a DC input voltage Vin of an input terminal into an output voltage Vo of an output terminal, wherein by a suitable parameter design and operating range, the power transistors of the bridge circuit lying to the primary side of the transformer TX can be assured to operate under the condition of zero-voltage switching (ZVS), and rectification transistors lying to the secondary side of the transformer TX can implement zero-current switching (ZCS). From the resonance circuit 120 proper, the three resonance parameters determine two resonance frequencies fs and fin shown in following Equation (1) and Equation (2):

$$fs=1/[2\pi(Ls\cdot Cs)^{1/2}] \quad (1)$$

$$fm=1/\{2\pi[(Ls+Lm)\cdot Cs]\}^{1/2}\} \quad (2)$$

The transformer TX isolates the switch circuit 110 and the resonant circuit 120 from the full-wave rectification circuit 130 by a primary side coil np and two secondary side coils ns1 and ns2 connected in in-phase series. The full-wave rectification circuit 130 includes a pair of synchronous rectification transistors Q1 and Q2 coupled to an output capacitor Co. Sources of the transistors Q1 and Q2 are coupled to a ground terminal of the output voltage Vo. A drain of the transistor Q1 is coupled to an undotted terminal of the secondary side coil ns2, and a drain of the transistor Q2 is coupled to the dotted terminal of the secondary side coil ns1. Additionally, a common connection node between the secondary coils ns1 and ns2 forms a high-voltage terminal of the output voltage Vo.

The power transistors S1 and S2 of the LLC series resonance converter 100 operate at equal pulse width, which is at 50%. A frequency adjustment control circuit 140 is therefore demanded because an adjustment of the output voltage Vo is obtained by changing an operating frequency (switching frequency) f. Additionally, a synchronous rectification driving-signal generating circuit 150 producing suitable gate signals is inserted in the full-wave rectification circuit 130 in order to correctly turn on and turn off the synchronous rectification transistors Q1 and Q2.

Please refer to FIG. 2, which is a waveform diagram showing a time sequence versus waveforms under a condition the operating frequency of the conventional LLC series resonance converter being less than the resonance frequency, wherein the switching frequency f of the transistors (switches) S1 and S2 satisfies the following formula:

$$fh \leqq f \leqq fs \quad (3)$$

In FIG. 2, an abscissa expresses time, and an ordinate is arranged in four portions. From top to bottom in the given order, the waveforms are voltage waveforms of the two transistors S1 and S2 in the switch circuit 110, current waveforms of a primary side current $i_r$ and a magnetizing current $i_m$, current waveforms of the two transistors Q1 and Q2 in the full-wave rectification circuit 130, and voltage waveforms of the two transistors Q1 and Q2 in the full-wave rectification circuit 130.

At time of $t_0$, because the primary side current $i_r$ is opposite to a reference direction, the power switch S1 is turned on under the ZVS condition. During an interval between t0 and t1, the synchronous rectification transistor Q1 is turned on to have a current, therefore a voltage of the magnetizing inductor Lm is constant and the magnetizing inductor Lm does not take part in the resonance so that the magnetizing current $i_m$ increases linearly. Due to the resonance between the resonance inductor Ls and the resonance capacitor Cs, the current $i_{Q1}$ through the synchronous rectification transistor Q1 appears in a quasi-sine waveform.

At time of $t_1$, because the switching period of the working transistor is longer than the resonant period between the resonance inductor Ls and the resonance capacitor Cs, the primary side current $i_r$ decreases to be equal to the magnetizing current $i_m$ before a turn-off of the synchronous rectification transistor Q1 so that the synchronous rectification transistor Q1 should be turned off at this moment. As the resonance capacitor Cs, the resonance inductor Ls and the magnetizing inductor Lm jointly take part in the resonance, for the purpose simplifying analysis, the primary side current $i_r$ is regarded as a straight line approximately under the condition of Lm>>Ls supposed.

At time of t2, the transistor S1 is turned off and a body diode of the transistor S2 is turned on. At time of t3, a voltage of the transistor S1 drops to a voltage of the body diode, and the transistor S2 is turned on under ZVS condition. During intervals from t3 to t4 and from t4 to t5, similar operating processes can be analyzed out. The operating statuses and the current waveform $i_{Q2}$ similar to the synchronous rectification transistor Q1 also occur to the synchronous rectification transistor Q2. The currents $i_{Q1}$ and $i_{Q2}$ compose an output rectification current $i_{rec}$. During the interval between $t_1$ and $t_2$ or between $t_4$ and $t_5$, because the current of the synchronous rectification transistors Q1 or Q2 decreases to zero, which always happens before the synchronous rectification transistor S1 or S2 is turned off, conducting pulse widths for the synchronous rectification transistors Q1 and Q2 are smaller than conducting pulse widths for the transistors S1 and S2.

In FIG. 2, driving pulses of the synchronous rectification transistors Q1 and Q2 have to be off when the currents (flowing from the sources to the drains) decrease to zero, that is, are off during the dead time ($t_1$~$t_2$) of the $i_{rec}$. Otherwise, the phenomena occur that the synchronous rectification transistors Q1 and Q2 are turned on at the same time and the secondary coils ns1 and ns2 short-circuit, so that the circuit would not be able to operate properly and safely. Accordingly, the driving signals of the synchronous rectification transistors Q1 and Q2 cannot be simply obtained from the driving signals of the power switches S1 and S2, and neither can be obtained from the coils of the transformer TX.

When the LLC series resonance converter 100 operates at a frequency f greater than the resonance frequency fs, the dead area of the output rectification current $i_{rec}$, that is, the time interval both the synchronous rectification transistors Q1 and Q2 are turned off, will disappear. Under this condition, the output rectification current $i_{rec}$ has a quasi-sine absolute value waveform, and the driving pulses of the synchronous rectification transistors Q1 and Q2 are synchronous with the driving pulses of the corresponding switches S1 and S2, as shown in FIG. 3. Additionally, when the LLC series resonance converter 100 operates at the frequency f greater than the resonance frequency fs, the dead area of the above-mentioned $i_{rec}$ become zero and the driving signals of the synchronous rectification transistors Q1 and Q2 can be simply obtained from the driving signals of the power switches S1 and S2 lying in the primary side.

Please refer to FIG. 4, which is a circuit diagram showing a conventional synchronous rectification scheme of the conventional LLC series resonance converter. In FIG. 4 and FIG. 1, identical circuit devices are given identical graphical symbols. Additionally, at least a synchronous circuit 410, a constant width pulse generator 420, and an AND gate 430 are further installed in the LLC series resonance converter 400.

In FIG. 4, when the switching frequency of the transistors S1 and S2 is less than the resonance frequency fs, the constant width pulse generator 420 produces a synchronous rectification driving signal, a pulse width of which is determined by the resonance parameters Ls and Cs, and a rising edge of which is synchronized with a rising edge of a synchronous signal $V_{SYN}$ by the synchronous circuit 410. The synchronous signal $V_{SYN}$ can be a voltage signal of a secondary side coil of the transformer TX, can be a driving signal of high-side or low-side power device lying in one arm of the half-bridge or fall-bridge switch circuit as well, and of course can be also obtained by detecting a conducting voltage across a body diode of a synchronous rectification transistor.

When the switching frequency f is greater than the resonance frequency fs, the driving signals the synchronous rectification transistors Q1 and Q2 are synchronized with the driving signals of the transistors S1 and S2. The constant width pulse signal $V_{FOT}$ and the driving signal Vg of the transistor S1 (or S2) processed by the AND gate 430 to obtain the synchronous rectification driving signal complete.

The advantage of the scheme in FIG. 4 is that the circuit is simple and only requires one synchronous circuit 410 and one constant width pulse generator 420. But the disadvantage is that the adaptive ability is insufficient and the driving pulse width cannot be adjusted automatically in accordance with the variance of the circuit parameters so that the best control of the synchronous rectification transistors cannot be achieved.

Please refer to FIG. 5, which is a circuit diagram showing another conventional synchronous rectification scheme of the conventional LLC series resonance converter. In FIG. 5 and FIG. 1, identical circuit devices are given identical graphical symbols. Additionally, it is known by comparing FIG. 5 and FIG. 4 that the AND gate is removed from the LLC series resonance converter 500 but a comparator 510 and an OR gate 520 are installed in addition to.

In FIG. 5, when a current flows through the drain and the source of the synchronous rectification transistor, a channel resistance of which causes a voltage drop to be generated across. The voltage drop $V_{ds}$(on) and a constant reference voltage $V_{ref}$ are compared by the comparator 510 to produce a pulse signal $V_{com}$. In a state of a light load, as the voltage drop $V_{ds}$(on) is very small, a comparing signal is difficult to be obtained so that the constant width pulse $V_{FOT}$ is produced by the synchronous circuit 410 and the constant width pulse generator 420 the same as FIG. 4. The constant width pulse signal $V_{FOT}$ and the pulse signal $V_{com}$ are processed by the OR gate 520 to obtain the complete synchronous rectification driving signal.

The advantage of the scheme in FIG. 5 is that the driving pulses of the synchronous rectification transistors can be obtained adaptively. However, the amplitude of the voltage $V_{ds}$(on) is very low. In order to accomplish the best synchronous rectification effect, the reference voltage $V_{ref}$ has to be very low so that the voltage $V_{ds}$(on) is very easily influenced by disturbance. Particularly, when the LLC circuit operates in states of a light load, starting, a dynamic load, or a protection -circuit working, as the voltage $V_{ds}$(on) has oscillation or is disturbed, the output signal $V_{com}$ of the comparator 510 appears an error signal, and if the error signal is serious, the synchronous rectification transistors will have a common short-circuit phenomenon.

SUMMARY OF THE INVENTION

It is therefore an aspect of the present invention to provide a resonance converter and a synchronous rectification driving method thereof. The resonance converter includes a switch circuit having at least two first switches, a resonance circuit having a resonance frequency, a transformer, and a full-wave rectification circuit having two second switches each of which has a drain and a source and generates a channel resistance voltage when a current flows through the drain and the source. The synchronous rectification driving method includes steps as follow. When an operating frequency of the resonance converter is less than the resonance frequency and the resonance converter is coupled to a light load, a constant width pulse determined by resonance parameters of the resonance circuit is used to drive the second switches of the full-wave rectification circuit; when the operating frequency of the resonance converter is less than the resonance frequency and the resonance converter is coupled to a heavy load, the channel resistance voltage is compared with a reference voltage by the synchronous rectification driving circuit for driving the second switches of the full-wave rectification circuit; and when the operating frequency of the resonance converter is not smaller than the resonance frequency, duplicated signals of signals used to drive the first switches are respectively used by the synchronous rectification driving circuit to drive the second switches of the full-wave rectification circuit.

The foregoing and other features and advantages of the present invention will be more clearly understood through the following descriptions with reference to the drawings, wherein:

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
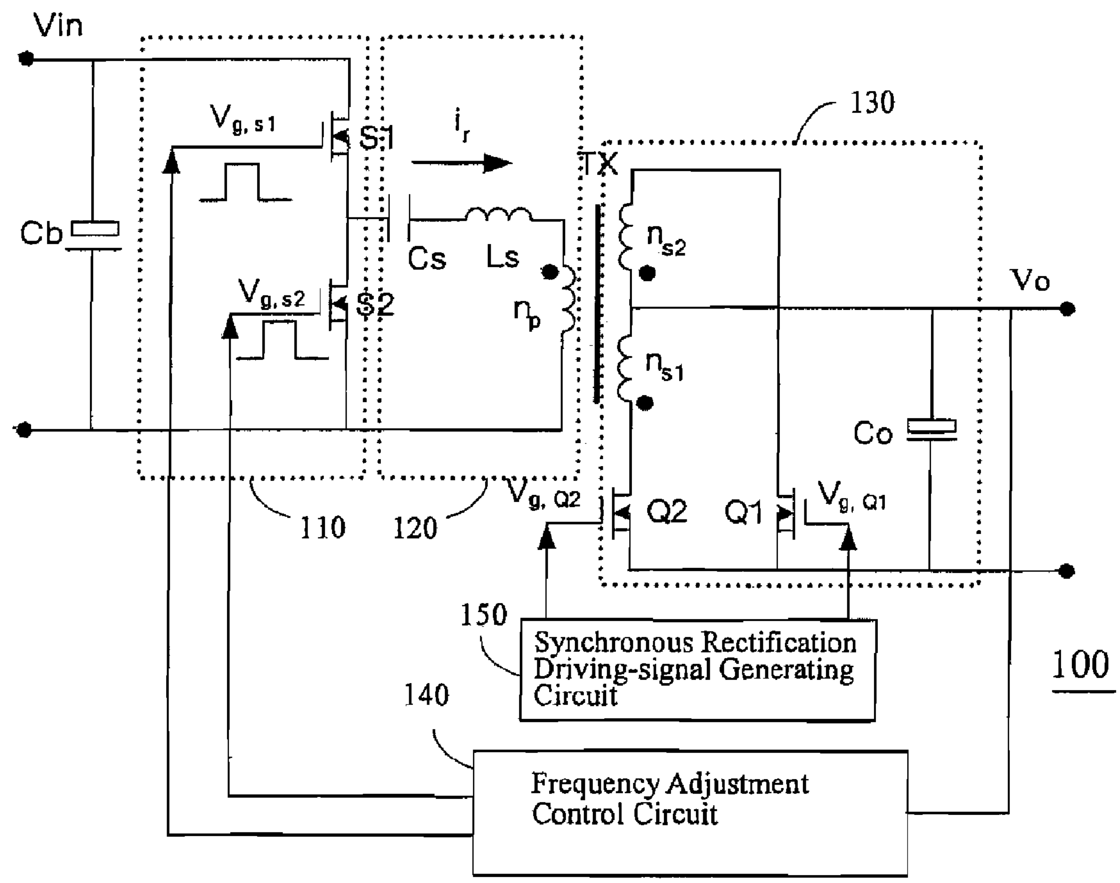
FIG. 1 is a circuit diagram showing a circuit of a conventional LLC series resonance converter having synchronous rectification transistors.
Figure 2:
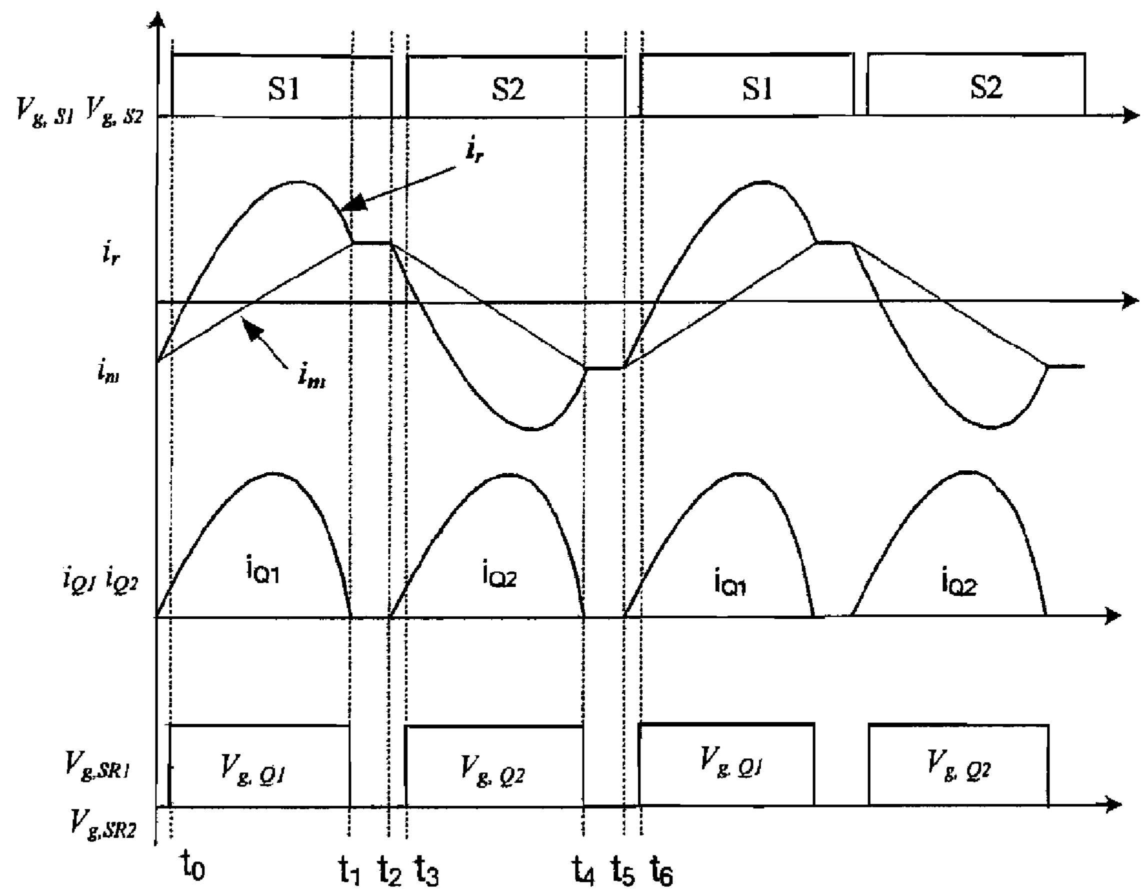
FIG. 2 is a waveform diagram showing a time sequence versus waveforms under a condition the operating frequency of the conventional LLC series resonance converter being less than the resonance frequency.
Figure 3:
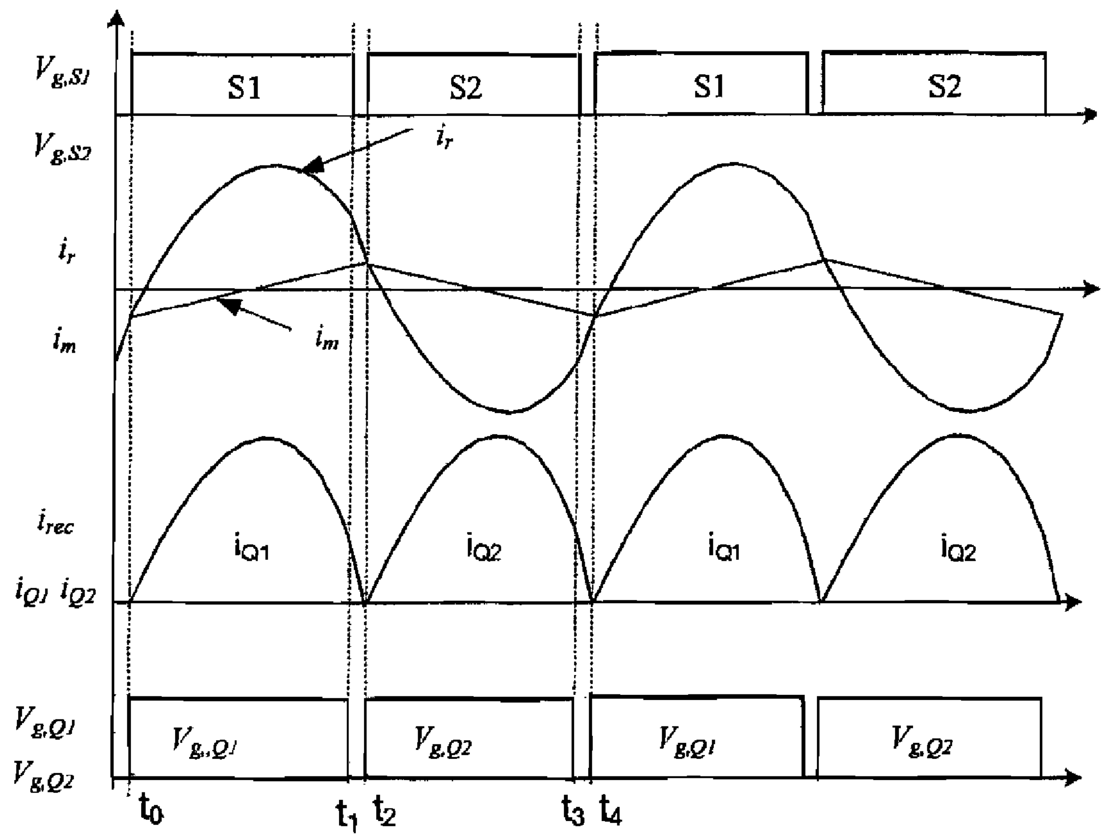
FIG. 3 is a waveform diagram showing a time sequence versus waveforms under a condition the operating frequency of the conventional LLC series resonance converter being greater than the resonance frequency.
Figure 6:
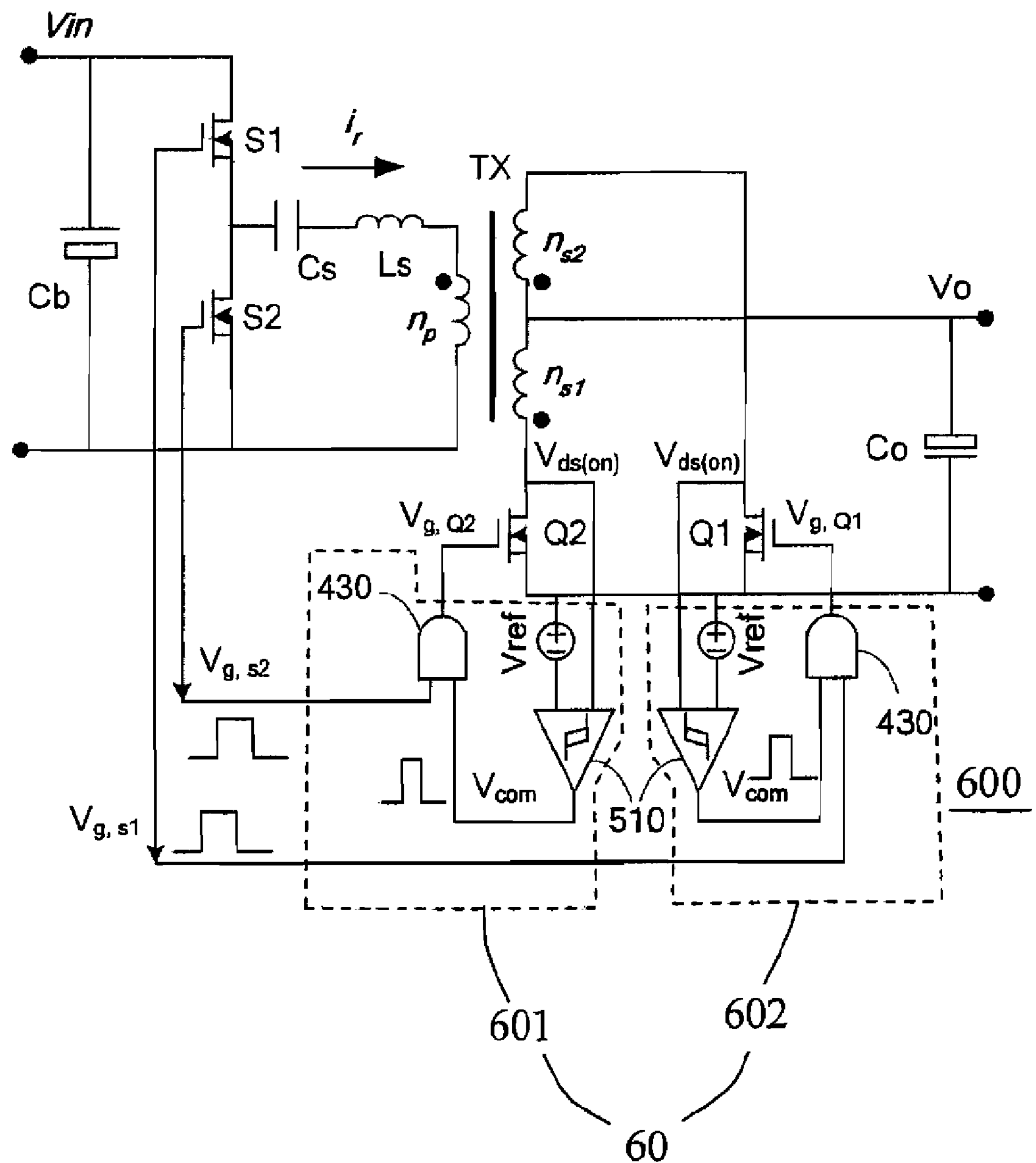
FIG. 6 is a circuit diagram showing a synchronous rectification scheme of an LLC series resonance converter according to the first embodiment of the present invention.

Please refer to FIG. 6, which is a circuit diagram showing a synchronous rectification scheme of an LLC series resonance converter according to the first embodiment of the present invention. In FIG. 6 and FIG. 1, identical circuit devices are given identical graphical symbols so that it is unnecessary to go into details. It is noted that although composed of a half-bridge circuit having only a bridge arm, the input stage of the switch circuit can be similarly composed of a full-bridge circuit having two bridge arms. Additionally, although the transistor switches are used as the switching devices, it does not influence that the switches are used to define various variants of the upperseat concept in the circuits of the embodiments. Furthermore, a synchronous driving circuit 60 is installed in an LLC series resonance converter 600 for implementing the synchronous rectification driving method of the present invention.

The synchronous rectification driving method provided in the present invention includes steps as follow. Firstly, when an operating frequency of the resonance converter 600 is less than the resonance frequency and the resonance converter 600 is coupled to a light load, a constant width pulse determined by resonance parameters of the resonance circuit is used to drive the synchronous rectification transistors Q1 and Q2 of the full-wave rectification circuit. Secondarily, when the operating frequency of the resonance converter 600 is less than the resonance frequency and the resonance converter 600 is coupled to a heavy load, the channel resistance voltage $V_{ds}$(on) is compared with a reference voltage $V_{ref}$ by the synchronous rectification driving circuit for driving the synchronous rectification transistors Q1 and Q2 of the full-wave rectification circuit. Lastly, when the operating frequency of the resonance converter 600 is not smaller than the resonance frequency, duplicated signals of signals used to drive the power transistors S1 and S2 are respectively used by the synchronous rectification driving circuit to drive the synchronous rectification transistors Q1 and Q2 of the full-wave rectification circuit.

In order to implement the aforementioned synchronous rectification driving method, applicant provides the first circuit layout showing the synchronous rectification driving circuit 60 as shown in FIG. 6. The synchronous rectification driving circuit 60 includes two identical secondary driving circuits 601 and 602.

Now, let's take the secondary driving circuit 601 as an example to describe. The secondary driving circuits 601 includes a reference voltage source $V_{ref}$, a comparator 510, and an AND gate 430. A first terminal of the reference voltage source $V_{ref}$ is coupled to a source terminal of the synchronous rectification transistor Q2, and a second terminal of the reference voltage source $V_{ref}$ is coupled to a first input terminal of the comparator 510. A second terminal of the comparator 510 is coupled to a drain of the synchronous rectification transistor Q2, and an output terminal of the comparator 510 is coupled to a second terminal of the AND gate 430. A first terminal of the AND gate 430 is coupled to a gate terminal of the power transistor S2, and an output terminal of the AND gate 430 is coupled to a gate terminal of the synchronous rectification transistor Q2.

In the present invention, the synchronous rectification driving method implemented by the secondary driving circuits 601 are described as follows. As shown in FIG. 6, when a current flows from the source to the drain through the synchronous rectification transistor Q2, a channel resistance voltage $V_{ds}$(on) is generated across a channel resistance of the synchronous rectification transistor Q2. The channel resistance voltage $V_{ds}$(on) is compared with the reference voltage $V_{ref}$ by the comparator 510 for obtaining a pulse signal $V_{com}$. The pulse signal $V_{com}$ and a driving signal $V_{g,S2}$ of the power transistor S2 are processed by the AND gate 430 to obtain the synchronous rectification driving signal complete. When the series resonance converter operates in states of a light load, starting, a dynamic load, or a protection circuit working, the operating frequency can be greater than the resonance frequency. At this time, if the channel resistance voltage $V_{ds}$(on) is disturbed to cause the output signal $V_{com}$ of the comparator 510 to appear an error signal, the synchronous rectification driving method employed in the present invention can prevent an unwanted phenomenon from occurring. The unwanted phenomenon is that the switches of the synchronous rectification circuit are incorrectly driven due to the error signal of the pulse signal $V_{com}$.

Figure 4:
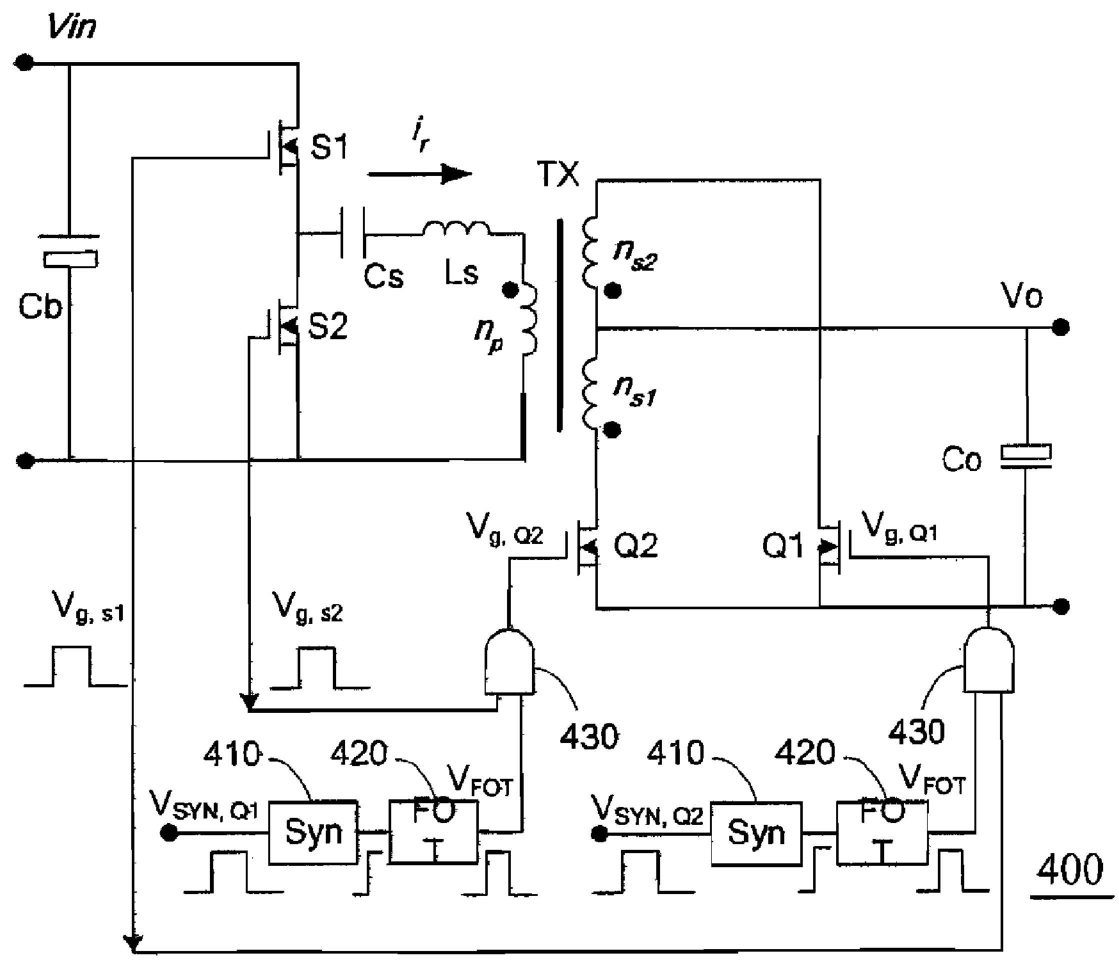
FIG. 4 is a circuit diagram showing a conventional synchronous rectification scheme of the conventional LLC series resonance converter.
Figure 5:
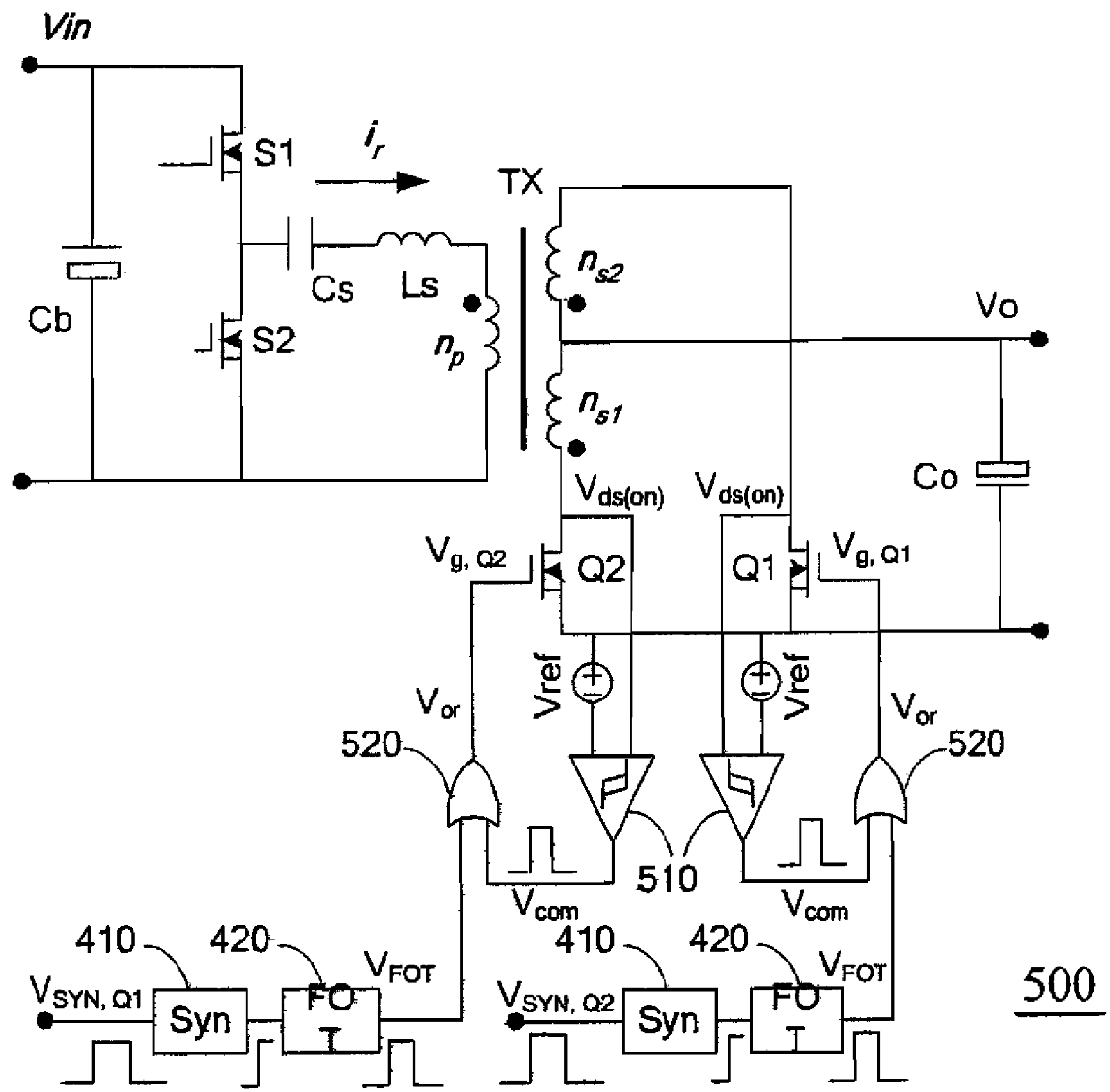
FIG. 5 is a circuit diagram showing another conventional synchronous rectification scheme of the conventional LLC series resonance converter.
Figure 7:
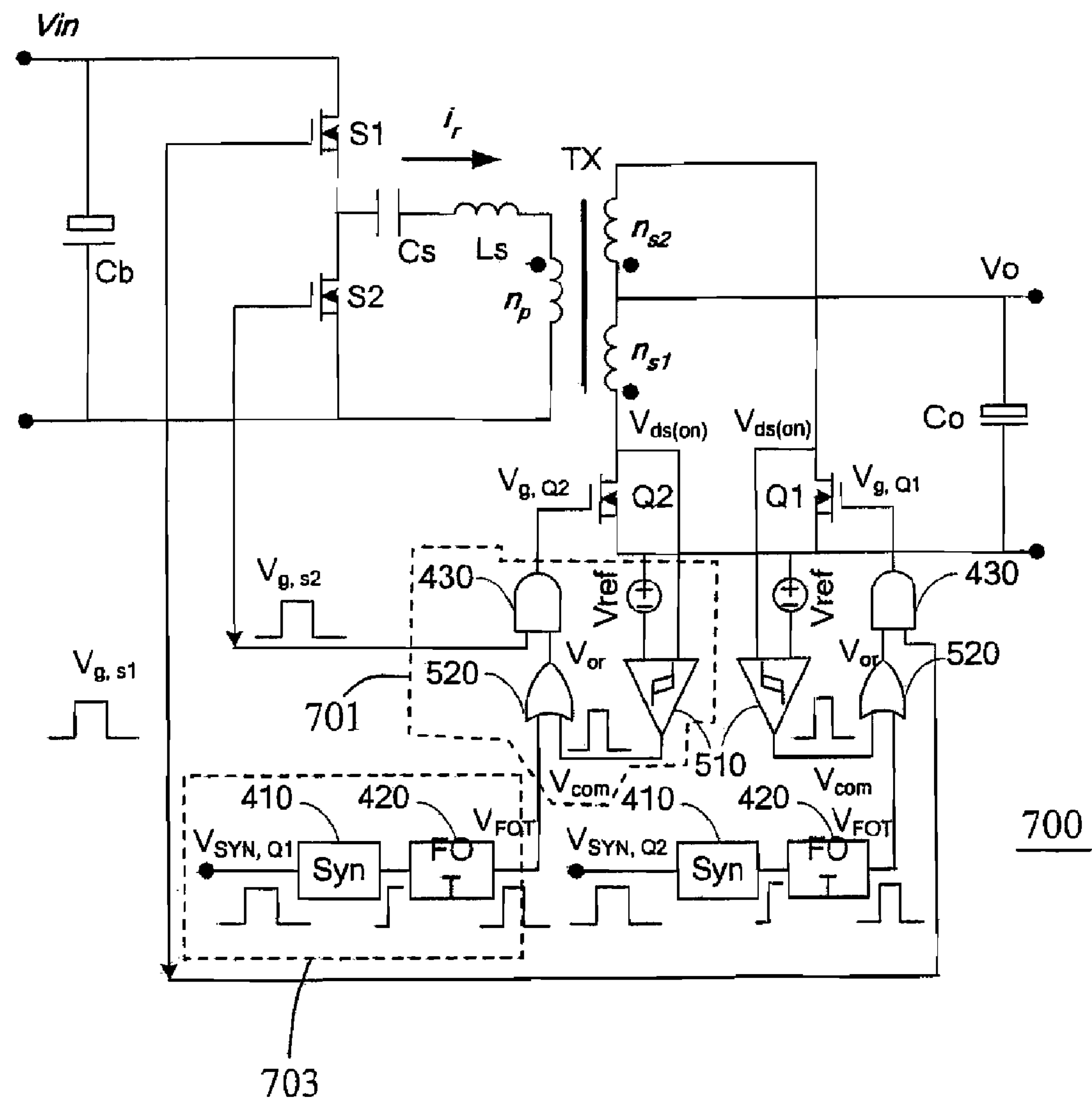
FIG. 7 is a circuit diagram showing a synchronous rectification scheme of an LLC series resonance converter according to the second embodiment of the present invention.

Please refer to FIG. 7, which is a circuit diagram showing a synchronous rectification scheme of an LLC series resonance converter according to the second embodiment of the present invention. In the state of the light load, the amplitude of the channel resistance voltage $V_{ds}$(on) is very low, which causes the comparing signal difficult to be obtained. Therefore, an auxiliary circuit 703 is introduced to produce a constant width pulse signal $V_{FOT}$. The auxiliary circuit 703 includes a synchronous circuit 410 and a constant width pulse generator 420 the same as FIG. 4. Additionally, an OR gate 520 is inserted in the secondary driving circuits 601 of FIG. 6 to form FIG. 7. A first terminal of the OR gate 520 is coupled to the auxiliary circuit 703, a second terminal of the OR gate 520 is coupled to an output terminal of the comparator 510, and an output terminal of the OR gate 520 is coupled to a second terminal of the AND gate 430.

The constant width pulse signal $V_{FOT}$ and the pulse signal $V_{com}$ are processed by the OR gate 520 to obtain a signal $V_{OR}$, and the pulse signal $V_{com}$ and the driving signal $V_{g,S2}$ of the power transistor S2 are processed by the AND gate 430 to obtain the synchronous rectification driving signal complete.

Two AND gate, and two AND gate together with two OR gate are respectively used in the two embodiments of the present invention to implement the adaptive control of the synchronous rectification driving signal. However, when a concrete circuit is implemented, the applicable architecture are not limited to the above logical gate architectures, that is, any circuit architecture capable to implement the synchronous rectification driving method like the synchronous rectification driving circuit 60 is included within the claims of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A resonance converter, comprising:

a switch circuit having at least one bridge circuit comprising two first switches;

a resonance circuit coupled to the switch circuit and having a resonance frequency;

a transformer having a primary side coupled to the resonance circuit and a secondary side;

a full-wave rectification circuit coupled to the secondary side of the transformer and having two second switches wherein each of the second switches has a drain and a source and a channel resistance voltage is generated when a current flows through the drain and the source; and a synchronous rectification driving circuit coupled to the switch circuit and the full-wave rectification circuit, wherein:

when an operating frequency of the resonance converter is less than the resonance frequency and the resonance converter is coupled to a heavy load, the channel resistance voltage is compared with a reference voltage by the synchronous rectification driving circuit for driving the second switches of the full-wave rectification circuit; and when the operating frequency of the resonance converter is not smaller than the resonance frequency, duplicated signals of signals used to drive the first switches are respectively used by the synchronous rectification driving circuit to drive the corresponding second switches of the full-wave rectification circuit.

2. A resonance converter according to claim 1, wherein the switch circuit is one of a half-bridge circuit and a full-bridge circuit and the first switches are power transistors.

3. A resonance converter according to claim 1, wherein the resonance circuit further comprises a resonance capacitor, a resonance inductor, and a magnetizing inductor connected in series.

4. A resonance converter according to claim 1, wherein the second switches are power transistors.

5. A resonance converter according to claim 1, wherein when the operating frequency of the resonance converter is less than the resonance frequency and the resonance converter is coupled to a light load, a constant width pulse determined by resonance parameters of the resonance circuit is used to drive the second switches of the full-wave rectification circuit.

6. A resonance converter according to claim 1, wherein the synchronous rectification driving circuit comprises two secondary driving circuits, each of which is coupled to one of the two first switches and the corresponding second switch, the first switch has a first input terminal, a first output terminal and a first control terminal, the second switch has a second input terminal, a second output terminal and a second control terminal, and each secondary driving circuit comprises:

a reference voltage source having a first terminal coupled to the second output terminal;

a comparator having a third input terminal coupled to a second terminal of the reference voltage source, a fourth input terminal coupled to the second input terminal, and a third output terminal; and an AND gate having a fifth input terminal coupled to the first control terminal, a sixth input terminal coupled to the third output terminal, and a fourth output terminal coupled to the second control terminal.

7. A resonance converter according to claim 6, wherein the first and the second switches both are transistors, and the input terminal, the output terminal, and the control terminal correspond to a drain, a source, and a gate of the transistors respectively.

8. A resonance converter according to claim 1, wherein the synchronous rectification driving circuit comprises two secondary driving circuits, each of which is coupled to one of the two first switches and the corresponding second switch, the first switch has a first input terminal, a first output terminal and a first control terminal, the second switch has a second input terminal, a second output terminal and a second control terminal, and each secondary driving circuit comprises:

a reference voltage source having a first terminal coupled to the second output terminal, a comparator having a third input terminal coupled to a second terminal of the reference voltage source, a fourth input terminal coupled to the second input terminal, and a third output terminal;

an AND gate having a fifth input terminal coupled to the first control terminal, a sixth input terminal, and a fourth output terminal coupled to the second control terminal;

an OR gate having a fifth output terminal coupled to the sixth input terminal, a seventh input terminal coupled to the third output terminal, and an eighth input terminal; and an auxiliary circuit coupled to the eighth input terminal.

9. A resonance converter according to claim 8, wherein the auxiliary circuit further comprises a synchronous circuit and a constant width pulse generator.

10. A resonance converter according to claim 8, wherein the first and the second switches both are transistors, and the input terminal, the output terminal, and the control terminal correspond to a drain, a source, and a gate of the transistors respectively.

11. A synchronous rectification driving method for a resonance converter comprising a switch circuit having at least two first switches, a resonance circuit having a resonance frequency, a transformer, and a full-wave rectification circuit having two second switches, each of which has a drain and a source and generates a channel resistance voltage when a current flows through the drain and the source, comprising steps of:

when the operating frequency of the resonance converter is less than the resonance frequency the channel resistance voltage is compared with a reference voltage by the synchronous rectification driving circuit for driving the second switches of the full-wave rectification circuit; and when the operating frequency of the resonance converter is not smaller than the resonance frequency, duplicated signals of signals used to drive the first switches are respectively used by the synchronous rectification driving circuit to drive the second switches of the full-wave rectification circuit.

12. A synchronous rectifier driving method for a series resonant power converter comprising at least two primary switches, a resonant network, and a synchronous rectifier, wherein the two primary switches selectively connect a power source to the resonant network having a transformer, and the synchronous rectifier is connected between a secondary winding of the transformer and a DC output, the driving method comprising steps of:

receiving a primary switch driving signal;

detecting a first signal responding to a voltage across the synchronous rectifier;

comparing the primary switch driving signal and the first signal by an AND logic gate; and generating a synchronous rectifier driving signal by the AND logic gate for driving the synchronous rectifier.

13. A synchronous rectifier driving method according to claim 12, wherein the first signal is synchronous with the primary switch driving signal.

14. A synchronous rectifier driving method according to claim 12, wherein the voltage across the synchronous rectifier is a channel resistance voltage of the synchronous rectifier.

* * * * *